United States Patent [19]

Haussmann et al.

[11] Patent Number: 4,527,145

[45] Date of Patent: Jul. 2, 1985

[54] METHOD AND APPARATUS FOR THE DIGITAL CONTROL OF THE PHASE OF THE SYSTEM CLOCK OF A DIGITAL SIGNAL PROCESSING SYSTEM

[75] Inventors: Wolfgang Haussmann, Munich; Rainer Lüder, Oberhaching, both of Fed. Rep. of Germany

[73] Assignee: Siemens Aktiengesellschaft, Berlin and Munich, Fed. Rep. of Germany

[21] Appl. No.: 416,031

[22] Filed: Sep. 8, 1982

[30] Foreign Application Priority Data

Sep. 15, 1981 [DE] Fed. Rep. of Germany ....... 3136522

[51] Int. Cl.³ .............................................. H04N 9/46
[52] U.S. Cl. ...................................................... 358/19
[58] Field of Search ................. 358/19, 17, 20; 381/2, 381/1

[56] References Cited

U.S. PATENT DOCUMENTS

| 4,291,332 | 9/1981 | Kato | 358/19 |
| 4,339,770 | 7/1982 | Dennison | 358/19 |
| 4,395,729 | 7/1983 | Lewis | 358/19 |
| 4,404,583 | 9/1983 | Tatami | 358/19 |

Primary Examiner—Michael A. Masinick
Attorney, Agent, or Firm—Herbert L. Lerner; Laurence A. Greenberg

[57] ABSTRACT

Method for digitally controlling the phase of the system clock frequency of a digital signal processing system which processes an analog signal containing a reference signal, wherein a fixed phase relation exists between the digitalized reference signal and the system clock frequency, which includes digitalizing the reference signal by sampling the analog reference signal, weighting the scanning values of the digitalized reference signal for obtaining a digital phase comparison variable, feeding the phase comparison variable through a digital PLL filter to a digitally controlled oscillator, and deriving the system clock frequency from the output signal of the digitally controlled oscillator, and an apparatus for carrying out the method.

14 Claims, 10 Drawing Figures

METHOD AND APPARATUS FOR THE DIGITAL CONTROL OF THE PHASE OF THE SYSTEM CLOCK OF A DIGITAL SIGNAL PROCESSING SYSTEM

BACKGROUND OF THE INVENTION

1. Field of the Invention

The invention relates to a method and an apparatus for the digital control of the phase of the system clock of a digital signal processing system which processes an analog signal containing a reference signal, wherein a fixed phase relation exists between the digitalized reference signal and the system clock.

Such methods are required, for instance, in clock systems for digital color decoding, such as according to the PAL or NTSC principle. In these cases, the system clock must be synchronized as to phase and frequency with a multiple of the color carrier frequency, since the sampling of the analog FBAS (color picture blanking synchronous or composite color video) signal and the further processing of the digitized sampling values is accomplished at the system clock frequency. For the further processing of the digitized sampling values in such a digital signal processing system, further clock signals at the color carrier frequency are to be derived from the system clock. Such signals have an exact phase relative to the reference carrier, which is the reference signal contained in the analog FBAS signal.

2. Prior Art

It is known from German Published Non-Prosecuted Application DE-OS No. 28 54 236 and British Pat. No. 2,028,138, that for this purpose the FBAS signal obtained in the usual way controls the auxiliary color carrier quartz oscillator, which is constructed as a square wave signal clock generator, as in known color television receivers. The clock generator is synchronized by the color synchronization signal contained in the FBAS signal (a so-called burst signal) with a multiple of the auxiliary color carrier frequency. In this solution to the problem, the analog FBAS signal is therefore fed on one hand to an analog-to-digital (A/D) converter with a sampling apparatus and on the other hand is fed parallel thereto to an analog phase control loop which uses the burst signal contained in the FBAS signal for synchronization.

In digital signal processing systems, such solutions to the problem have the disadvantage of not ensuring the desired phase, because in the A/D converter propagation times occur between the input and the sampling device as well as in the clock generator. These are not negligible and they shift the sampling instant. Correcting through the use of a variable propagation time element is expensive and is not stable over the long term. It is a further disadvantage that such an analog phase control loop must be integrated together with the digital circuits on a chip, in a technology which is optimized for digital circuits.

SUMMARY

It is accordingly an object of the invention to provide a method and apparatus for the digital control of the phase of the system clock of a digital signal processing system processing analog signals, which overcomes the hereinafore-mentioned disadvantages of the heretofore-known methods and apparatus of this general type, and in which there is a fixed phase relation between the system clock and the sampling values of a reference signal contained in the analog signal.

With the foregoing and other objects in view there is provided, in accordance with the invention, a method for digitally controlling the phase of the system clock of a digital signal processing system which processes an analog signal (FBAS, composite video signal) containing a reference signal, wherein a fixed phase relation exists between the digitized reference signal and the system clock, which comprises digitizing the reference signal by sampling the analog reference signal, weighting and adding the scanning values of the digitized reference signal for obtaining a digital phase comparison variable, feeding the phase comparison variable through a digital PLL filter to a digitally controlled oscillator, and deriving the system clock frequency from the output signal of the digitally controlled oscillator.

In accordance with the invention, there is furthermore provided an apparatus for carrying out a method for digitally controlling the phase of the system clock of a digital signal processing system which processes an analog signal containing a reference signal, wherein a fixed phase relation exists between the digitalized reference signal and the system clock, comprising an A/D (analog/digital) converter for receiving and digitizing the analog signal containing the reference signal by sampling with a clock signal derived from the system clock, a sampler sampling circuit being connected to and engaged by the output of the A/D converter, a phase comparison circuit connected to the sampler for receiving every n-th sampling value of the reference signal from the sampler during the active time of the reference signal, the comparison circuit determining a phase deviation between the digitalized reference signal and the system clock by weighting, a PLL filter connected to the phase comparison circuit for receiving the phase deviation and providing digital output signals, an oscillator being connected to the PLL filter and being controllable by the digital output signals, the oscillator having an output providing an output signal from which the system clock can be derived.

In accordance with another feature of the invention, there is provided an apparatus for synchronizing the system clock of a digital color decoder with the first signal contained in the FBAS signal of a color television receiver containing a burst signal having a given burst time, comprising an A/D converter for receiving and digitizing the FBAS signal by sampling with n-times the color carrier frequency, a sample being connected and engaged by the output of the A/D converter, a phase comparison circuit connected to the sampler for receiving every n-th, particularly the fourth, sampling value of the burst signal from the sampler during the burst time, the comparison circuit determining a phase deviation between the digitalized burst signal and the system clock frequency by weighting and adding the samples, a PLL filter connected to the comparison circuit for receiving the phase deviation and providing digital output signals, and an oscillator being connected to the PLL filter and being controllable by the digital output signals, the oscillator having an output providing an output signal from which the system clock frequency can be derived.

In accordance with a further feature of the invention, there is provided a digital filter connected between the A/D converter and the sampler acting as a highpass filter for determining the mean position of the reference or burst signal.

In accordance with an added feature of the invention, the PLL filter is in the form of a proportional integrating filter.

In accordance with an additional feature of the invention, the PLL filter is constructed in accordance with the filter function:

$$H(z) = a + \frac{z'-1}{1-z'^{-1}};$$

where $z' = e^{j2\pi f/f_z}$ and $f_z$ is the line frequency.

In accordance with again another feature of the invention, the phase deviation formed by the comparison circuit or phase detector is a mean value $\phi_d$ of sampling values of the reference or burst signal for each n-th line according to:

$$\phi_d = \sum_j (+B_{0+j} - B_{1+j} - B_{2+j} + B_{3+j});$$

and for each n (−1)-th line according to $$\sum_j (-B_{0+j} - B_{1+j} + B_{2+j} + B_{3+j});$$

wherein j=0, 4, 8, . . . .

In accordance with again a further feature of the invention, there are provided means for supplying a color correction value, and including a subtracting stage connected to the sampler, the phase comparison circuit and the supplying means, for subtracting the color correction value from sampling values of the reference or burst signal.

In accordance with a concomitant feature of the invention, there is provided an apparatus for the phase-locked synchronization of the system clock of a device for digitally processing a stereo signal with a pilot tone contained in the stereo signal, comprising an A/D (analog/digital) converter for receiving and digitizing the stereo signal by sampling with n-times the frequency of the pilot tone, particularly eight-times, a digital filter connected to the A/D converter acting as a bandpass for the frequency of the pilot tone, a sampler being connected to the digital filter and being engaged by the output of the A/D converter through the digital filter, a phase comparison circuit connected to the sampler for receiving every n-th sampling value of the pilot tone, the phase comparison circuit determining a phase deviation between the digitalized pilot tone and the system clock frequency by weighting and adding the samples, a PLL filter connected to the phase comparison circuit for receiving the phase deviation and for providing digital signals, and an oscillator being connected to the PLL filter and being controllable by the digital signals provided by the PLL filter, the oscillator having an output providing output signals from which the system clock can be derived.

Other features which are considered as characteristic for the invention are set forth in the appended claims.

Although the invention is illustrated and described herein as embodied in a method and apparatus for the digital control of the phase of the system clock of a digital signal processing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
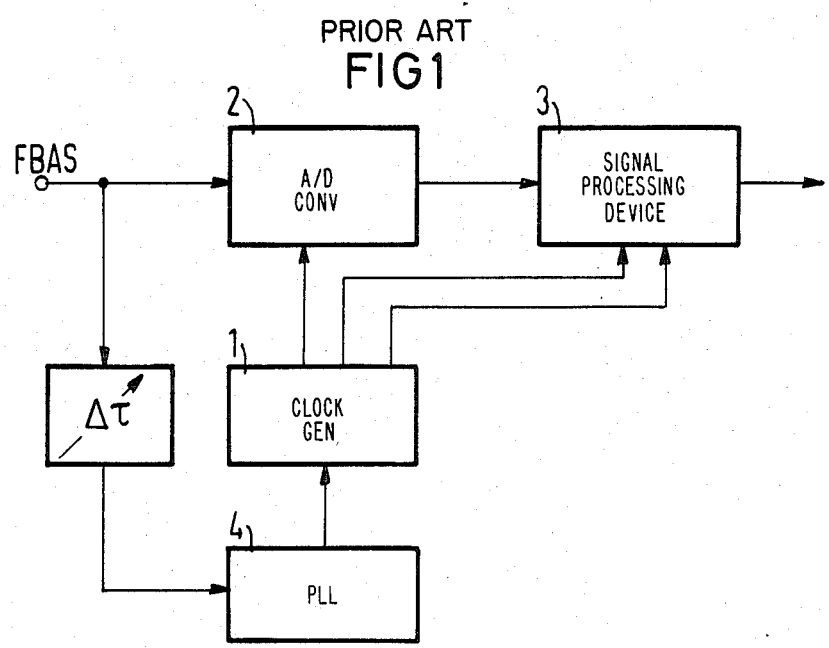
FIG. 1 is a block circuit diagram of an apparatus including an analog phase control loop such as can be used according to German Published Non-Prosecuted Application DE-OS No. 28 54 236 and British Pat. No. 2,028,138, for synchronizing the system clock generator of a digital color television receiver by utilizing the burst signal.

Referring now to the figures of the drawings in which like elements are designated with the same reference symbols, and first particularly to FIG. 1 thereof, there is seen a block circuit diagram of an apparatus for synchronizing a clock generator 1 with the transmitted color subcarrier frequency of a color television signal by utilizing the so-called burst signal contained in the FBAS signal FBAS. Such a device can be used, for instance, in a digital color television receiver known from German Published Non-Prosecuted Application DE-OS No. 28 54 236 and British Pat. No. 2,028,138. The analog FBAS signal FBAS is fed to an A/D converter 2 with a sampling device and subsequently to the digital signal processing device 3 proper. The signal FBAS is further fed to an analog phase control loop (PLL) 4, which uses the burst signal contained in the FBAS signal for synchronizing. The output signal of the analog phase control loop 4 is fed to the clock generator 1 which generates the sampling clock frequency for the A/D converter 2 and the necessary clock frequencies for the digital signal processing device 3.

In a digital system, this apparatus has the disadvantage of not ensuring the desired phase, because travel times occur which are not negligible and which shift the sampling time. Correction through the use of a travel time element (delay line) $\Delta \tau$ connected between the FBAS signal input and the analog phase control loop 4 is expensive and is not stable in the long term. A further disadvantage is that such an analog phase control loop must be integrated with digital circuits on a chip in a technology which is optimized for digital circuits. The travel times which are not known exactly are a particular disadvantage as well, because for the further processing of the color television signal in the digital signal processing device 3, sampling of the signal FBAS in the A/D converter 2 with a predetermined phase relationship to the color subcarrier (for instance phase 0 degrees) is required.

These disadvantages occur generally in the digital processing of an analog signal which contains a reference signal and which is to be processed in phase synchronism with the reference signal, so that there is a fixed phase relationship between the reference signal and the digitized signal. Such disadvantages are avoided, according to the invention, by the provision that the analog reference signal is digitized, its sampling values are weighted and a digital phase comparison variable is obtained from the weighted sampling values, which controls a phase control loop with a digital PLL filter that is known in the art.

Figure 2:
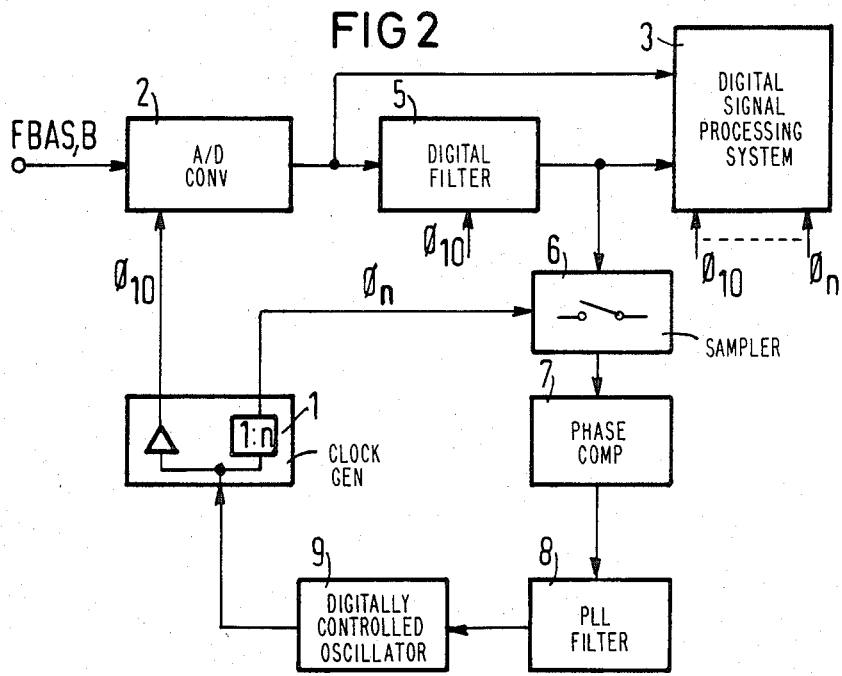
FIG. 2 is a block circuit diagram of a general embodiment example of an apparatus for carrying out the method according to the invention.

An embodiment example, in which the digitized sampling values of the reference signal are used in order to synchronize a fully digitally operating phase control loop, is shown in FIG. 2 in the form of a block circuit diagram. In the embodiment examples which will be discussed first, an FBAS signal (composite video signal) is assumed and the burst signal B serves as the reference signal contained in the input signal. The input signal FBAS is sampled by the clock $\phi_{10}$ with n-times the color carrier frequency; in the following explanation, a particular value of 4-times the color carrier frequency (17.73 MHz in the CCIR standard) is assumed and sampled and the digital sampling values are fed to a digital filter 5 which is likewise controlled by the clock $\phi_{10}$. The output signal of the digital filter 5 is fed to a sampler 6 which feeds every m-th sampling value of the burst signal to a digital phase comparison detector 7 and a PLL filter 8 during the burst time. The burst time is the time during which the burst signal occurs (burst gate pulse BG). In this case m=2, 4, 8 .... From the sampling values of the burst signal, the phase comparison circuit 7 determines its phase. Advantageously, the phase comparison circuit 7 determines the phase deviation from the amplitude and the sign of every fourth sampling value of the burst signal. The phase deviation becomes a digital control variable for a digitally controlled oscillator 9 after passing through a PLL filter 8. The output signal of the oscillator 9 which determines the system clock $\phi_{10}$ is fed to a clock generator 1 which delivers the system clock $\phi_{10}$ and further clock signals $\phi_n$ obtained by division of the system clock $\phi_{10}$, to the digital signal processing system 3.

The digital filter 5 as well as the phase comparison circuit 7 can be provided in the form of various constructions. The phase control loop can therefore be adapted to the burst signal transmission of different color television standards, such as for instance PAL, NTSC etc. Furthermore, the desired phase (0°, 45°) between the reference signal (burst signal) and the clock signal or stroke $\phi_n$ can be fixed.

Figure 3:
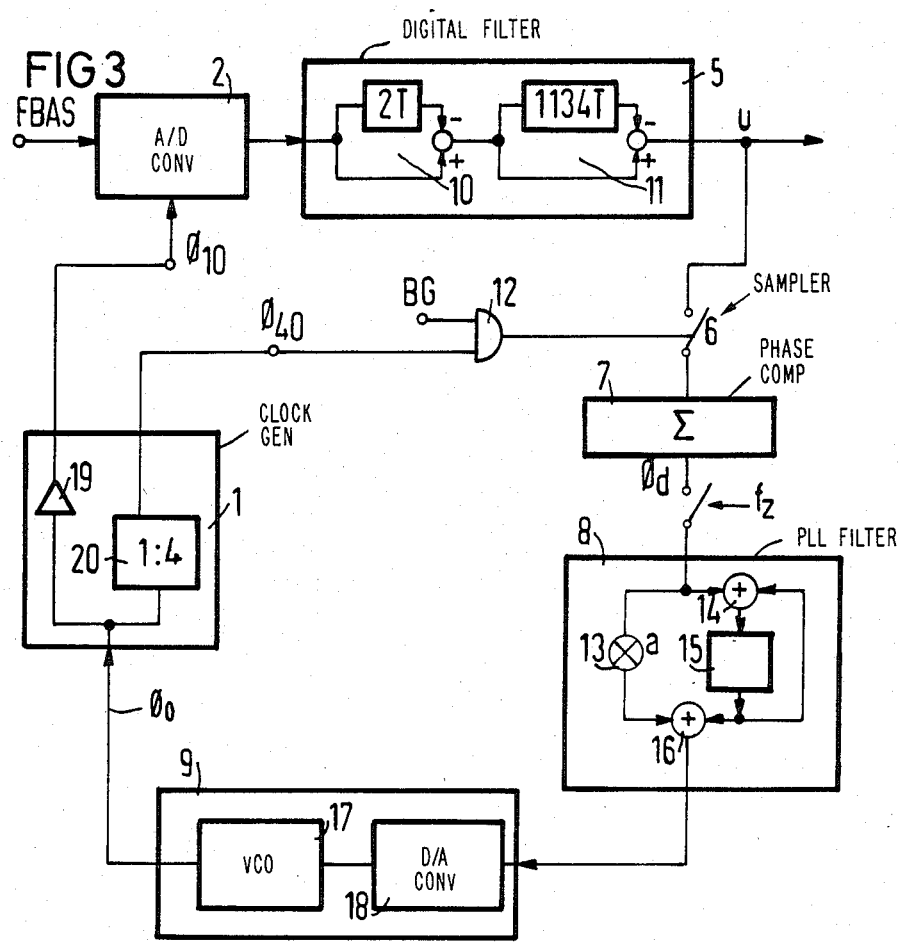
FIG. 3 is a schematic and block circuit diagram of a specific embodiment example according to the invention, of an apparatus for synchronizing the burst signal contained in the FBAS signal.

An embodiment example for carrying out the method according to the invention for the PAL standard is shown in FIG. 3. In the circuit according to FIG. 3, the digital filter 5 includes a series circuit of a bandpass filter 10 and a PAL comb filter 11. The bandpass 10 has the transfer characteristic $(1-z^{-2})$ with $z=e^{j\omega/f_A}$, i.e. at the output of the bandpass 10 the input signal delayed by two sampling periods (sampling period $=1/f_A$) is subtracted from the input signal. The bandpass 10 has the function of a bandpass filter and causes the burst signal and the chrominance signal to be filtered out of the digitized signal FBAS.

The PAL comb filter 11 has the transfer function $(1-z^{-1134})$, with $z=e^{j\omega/f_A}$. The comb filter forms from the alternating burst signal, which is peculiar to the PAL method. The average phase then represents the reference point for the control loop.

At the sampler 6, the $F_u$ component (modulated U-color difference signal) of the burst signal is therefore present. The sampler 6, which supplies, for instance, every fourth sampling value of the burst signal ($\phi_{40}$) to the phase comparison circuit 7, may be constructed, for instance, in such a manner that it is controlled by the output of an AND gate. One input of the AND gate is addressed by the clock signal $\phi_{40}$ and the other input is addressed by the burst gate pulse BG.

The phase comparison circuit 7 supplies the average value of these sampling values $\phi_d$ of the burst signal to the digital PLL filter 8 which operates with the line frequency $f_z$. The means value $\phi_d$ can be determined, for instance, by adding up every fourth sampling value of the burst signal, and can be transferred after the end of the burst gate pulse with the line frequency $f_z$ into the PLL filter 8. If every second sampling value of the burst signal is fed to the phase comparison circuit 7, then an improved average-value formation is achieved if the (i+2)th sampling values, provided with complimentary signs, are added together.

The digital PLL filter 8 which operates at the line frequency $f_z$ and determines the control behavior of the PLL circuit, has the transfer function $$H(z') = a + \frac{z'-1}{1 - z'^{-1}},$$

with $z'=e^{j2\pi f/f_z}$. The factor "a" is chosen in such a way that the desired transient behavior of the PLL circuit is obtained and that a small part of the phase difference $\phi_d$ present at the input of the filter 8 goes directly to the output, but a proportional larger part is integrated. The constant factor "a" can be chosen in the range between 10 and 100 and in particular between 40 and 80 and advantageously as a power of two ($2^n$).

The filter 8 (FIG. 3) can be constructed, for instance, in such a manner that the input signal addresses a multiplier 13 (factor "a") as well as a first input of a first adder 14; a register 15 is provided which is connected between the output of the adder 14 and a second input of the adder 14; and a second adder 16 is provided, one input of which is driven by the output of the multiplier 13, and another input of which is driven by the output of the register 15. The output signals of the filter 8 can be taken off at the output of the second adder 16. With appropriate multiplex operation, only one adder may be needed for the filter 8. If the factor "a" is the power of two, then the multiplier 13 is provided in the form of a simple digit shift.

In the steady-state condition, the respective second sampling values of the burst signal are zero; in the case of a deviation from the desired phase, a positive or negative error variable $\phi_d$ is generated which is integrated by the PLL filter 8, addresses the digitally controlled oscillator 9, and lets the phase deviation of the clock signal present at its output go to zero as compared to the burst signal. The digitally controlled oscillator 9 can be constructed, for instance, in such a manner that a voltage controlled oscillator 17, such as a VCO (voltage-controlled oscillator) is provided. The output signals of the filter 8 may be fed to the VCO 17 through a digital-to-analog converter 18. At the output of the oscillator 9, the clock signal $\phi_o$ which drives the clock generator 1 can be taken off. From the clock signal $\phi_o$, the system clock $\phi_{10}$ is generated in the clock generator 1 by a clock driver 19, and the clock signal $\phi_{40}$, which has one quarter of the frequency of the system clock $\phi_{10}$ is generated by a divider 20.

Figure 4:
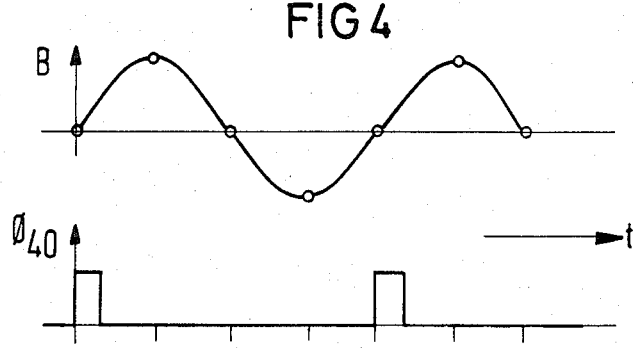
FIG. 4 is a graph of the phase which adjusts itself between the burst signal and the system clock in the embodiment example according to FIG. 3.

The phase at the point U after the comb filter 11 which adjusts itself between the burst signal B and the system clock $\phi_{40}$, as well as the phase of the sampling times (0°, 90°, 180°, 270°) of the burst signal B, are shown in FIG. 4. The sampling times are shown as circles on the burst signal.

As shown in FIG. 4, all the above-mentioned requirements as to the apparatus according to the invention are met.

In particular it is possible to maintain the fixed phase relation, which is important for the later processing of the FBAS signal in the digital signal processing stage 3, between the digitized sampling values, and to ensure the sampling of the color subcarrier with the phase 0°.

It can further be seen from FIG. 4 that sampling values which are obtained at the maximum or minimum of the burst signal, are less well suited as phase-sensitive output variables than sampling values which are obtained at the zero crossing of the burst signal.

Figure 5:
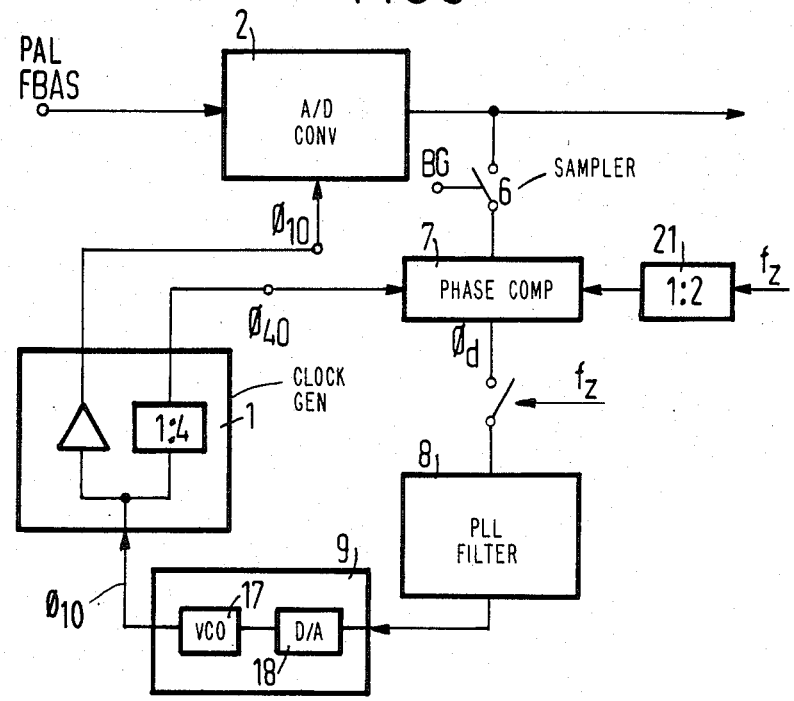
FIG. 5 is a block circuit diagram of a further embodiment example for an apparatus according to the invention, for synchronizing the system clock with the burst signal contained in the FBAS signal.

A further embodiment example for an apparatus according to the invention for synchronizing the system clock with the burst signal contained in the PAL-FBAS signal is shown in FIG. 5, as a block diagram. In this embodiment example, the digital filter 5 of FIG. 3 is omitted. The signal FBAS is digitized in the A/D converter 2 and fed through the sampler 6 to the phase comparison circuit 7. Corresponding to the explanation in connection with the embodiment example according to FIG. 3, the phase difference $\phi_d$ determined by the phase comparison circuit 7 is fed with the line frequency $f_z$ to the PLL filter 8, which is constructed, for instance, according to the PLL filter as per FIG. 3. The resultant signal then controls a digitally controlled oscillator 9 which, for instance, includes a D/A converter 18 and a VCO oscillator 17 and generates the system clock frequency $\phi_{10}$, and passes it on to the clock generator 1. On one hand, the clock generator 1 drives the A/D converter 2 with the system clock frequency $\phi_{10}$, and on the other hand it drives the phase comparison circuit 7 with the clock signal $\phi_{40}$, the frequency of which corresponds to one-quarter of the system clock frequency. The phase comparison circuit 7 is further addressed by a 1:2 divider 21 for the line frequency $f_z$ which may be constructed, for instance, as a toggle flip-flop.

Figure 6:
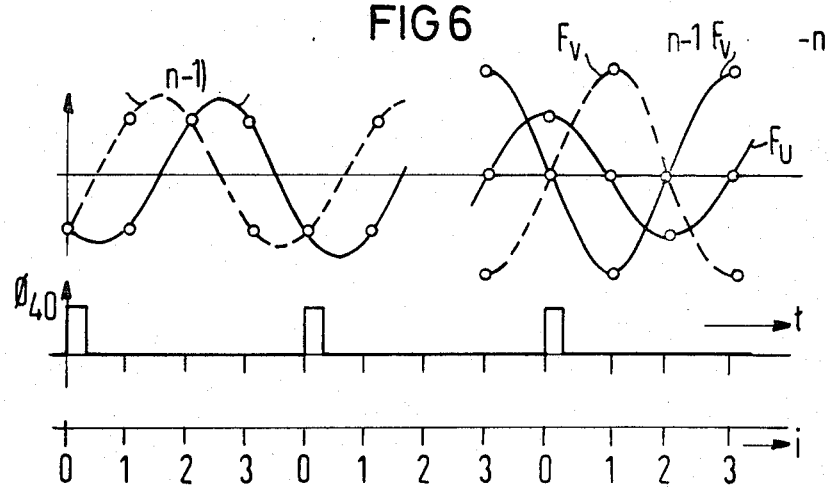
FIG. 6 is a timing graph showing the desired sampling times for the burst signal as well as for the color signal components in the embodiment example according to FIG. 5.

The desired sampling times for the burst signal B as well as for the modulated color difference components $F_u$, $F_v$ for the lines (n−1) and n are indicated by small circles in the timing diagram of FIG. 6.

In this embodiment example, the phase comparison circuit 7 adds the sampling values in accordance with a certain algorithm. During the burst time (sampler 6), the circuit 7 forms a weighted average value $\phi_d$ of the burst signal from the sampling values $B_j$, with j=0, 1, 2, ..., in such a manner that (see FIG. 6)

$$\phi_d \text{ (line } n) = \sum_j (\pm B_{0+k} - B_{1+k} - B_{2+k} + B_{3+k}) \text{ and}$$

$$\phi_d \text{ (line } n-1) = \sum_j (-B_{0+k} - B_{1+k} + B_{2+k} + B_{3+k}), \text{ where}$$

$$k = 0, 4, 8 \qquad j = k + i, \qquad i = 0, 1, 2, 3.$$

As in the embodiment example according to FIG. 3, $\phi_d$ is equal to zero at the reference phase. In the case of deviations from the desired reference phase, a positive or negative error variable $\phi_d$ is obtained which reduces the phase deviation through the PLL filter 8 and the oscillator 9. The phase comparison circuit 7 is switched from line to line by the 1:2 divider 21 for the line frequency $f_z$. The line-by-line switching and the weighting by plus/minus brings about a condition wherein phase control is effected relative to the mean phase (180°) of the burst signal. The alternating color phase of the burst signal, according to the PAL system, has no influence on the phase difference $\phi_d$. Through this cancellation of the alternating phase of the burst signal by switching the weighting, with sampling of the burst signal B different from 0°, it is possible to automatically sample at a phase of 45° the color difference components $F_u$ and $F_v$ determining the picture content, at zero degrees, as is desirable for the further processing of these signals.

According to the invention, the weighting of the scanned burst signal in the phase comparison circuit 7 can be generated, for instance, in such a manner that the sampling values of the burst signal are added up, where in the line n, the sign of the sample values i=1, 2, and in the line n−1, the sign of the sampling values i=0, 1 is inverted (i=0, 1, 2, 3). The starting position of the flip-flop 21 with reference to the phase of the burst is arbitrary, as is the phase of the clock signal $\phi_{40}$. In the synchronized state, the phase relations between burst, clock signal $\phi_{40}$ and the modulated chrominance signals and their sampling times are present as shown in FIG. 6.

Figure 7:
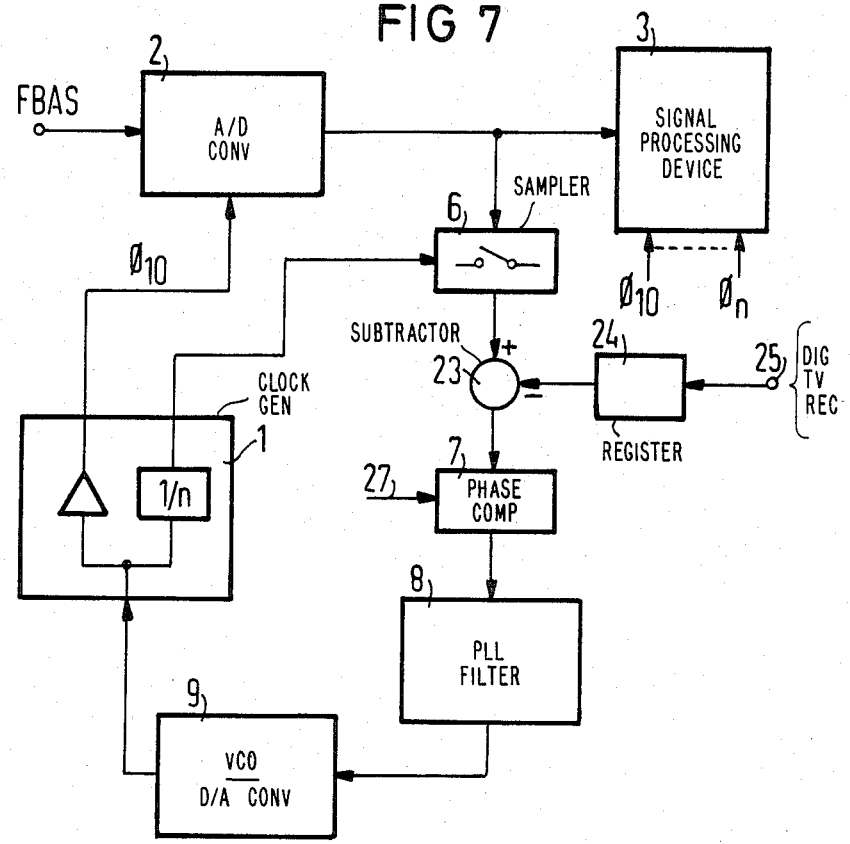
FIG. 7 is a block circuit diagram of an embodiment example of an apparatus for synchronizing the system clock with the burst signal, which has been expanded toward using FBAS signals standardized according to the NTSC standard.

An embodiment example of an apparatus for carrying out the synchronizing method according to the invention for color television receivers operating with the NTSC standard is shown in FIG. 7, in a block diagram. The embodiment example according to FIG. 7 is largely identical with the embodiment examples of FIGS. 3 and 5 which operate with the signals according to the PAL standard. In contrast to the embodiment examples according to FIGS. 3 and 5, the signal FBAS digitized by the A/D converter 2 is fed through the sampler 6 to a subtractor 23, the output of which addresses the phase comparison circuit 7. The NTSC color correction value 25 provided in color television receivers operating in accordance with the NTSC standard is stored in a register 24 and is subtracted from the values of the samplings of the burst signal in the subtraction stage 23.

Figure 8:
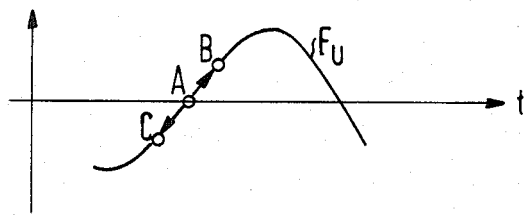
FIG. 8 is a timing graph for the shift of the sampling instants as a function of the NTSC color correction value in the embodiment example according to FIG. 7.

As shown in FIG. 8 through the example of the modulated chrominance signal $F_u$, the sampling point which is located, for instance, for the correction value zero at the point A, can be shifted in the direction B or C.

Figure 9:
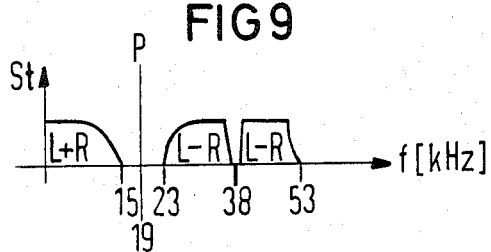
FIG. 9 is a graph of the frequency band of a stereo signal with a pilot tone.
Figure 10:
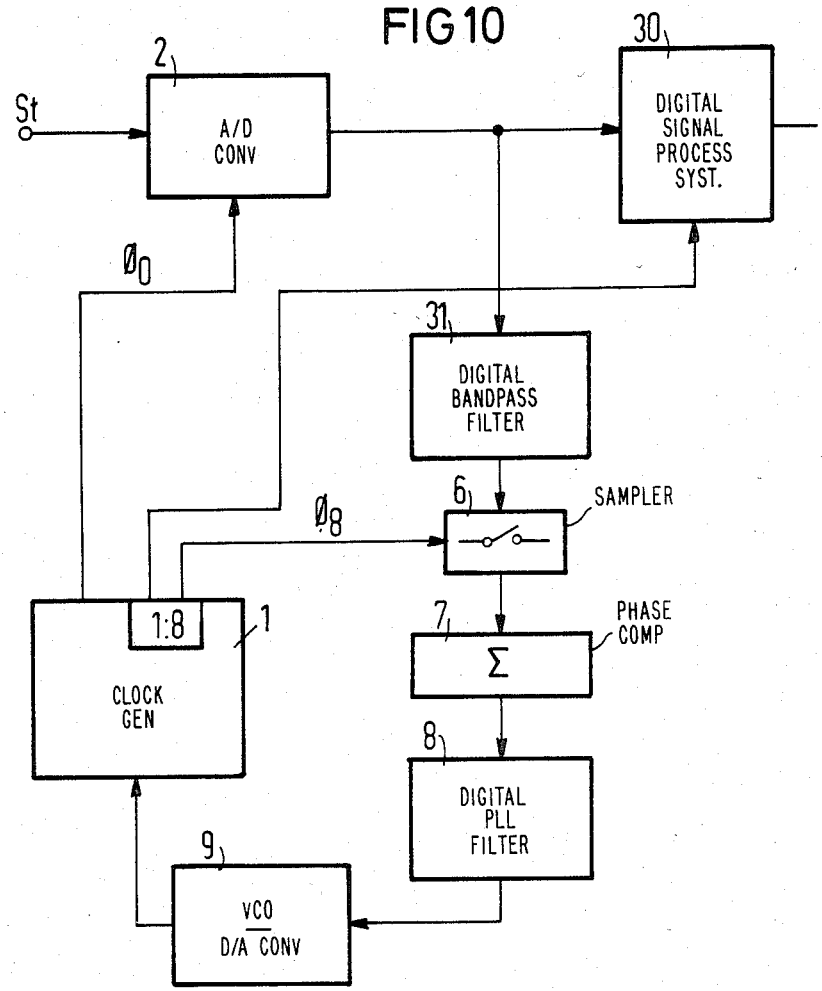
FIG. 10 is a block circuit diagram of an embodiment example of an apparatus according to the invention for synchronizing the system clock of an apparatus for the digital processing of the stereo signal according to FIG. 9.

A further embodiment example for the method according to the invention for digital phase control of a system clock of a digital signal processing system by means of the digitized sampling values of a reference signal, is shown in the block diagram of FIG. 10. The embodiment example according to FIG. 10 does not relate to the digital processing of a color television signal but to the digital processing of a stereo (broadcasting) signal in a digital stereo signal processing device 30. As is shown in FIG. 9, the stereo signal can be formed, for instance, of the frequency band for information (L+R) (left-hand channel and right-hand channel) of 0 to 15 kHz, a pilot tone P of 19 kHz as the reference signal, and the frequency bands of from 23 kHz to 38 kHz and from 38 kHz to 53 kHz for information (L−R). It is an object of the invention to provide an apparatus which will synchronize the system clock $\phi_o$ which is a multiple of the frequency of the pilot tone P, such as 8×19 kHz=152 kHz, with the pilot tone P in a rigid phase relationship. To this end, the stereo signal St is sampled by the A/D converter 2 with the frequency of 152 kHz at the system clock $\phi_o$, and quantized. The pilot tone P is separated by a digital bandpass 31 for the frequency of the pilot tone of 19 kHz; the construction of the bandpass filter 31 is known. In the sampler 6, every eighth value of the pilot tone P is then fed in for forming an average in the phase comparison circuit 7. The output signal corresponds to a phase difference which pulls along a digitally controlled oscillator 9, (such as a VCO) through the digital PLL filter 8. The system clock signal $\phi_o$ delivered by the oscillator 9 is passed on by the clock generator 1 to the A/D converter 2, is divided by eight as a signal $\phi_8$ (19 kHz) that is passed on to the sampler 6, and is fed accordingly to further required subdivisions of the digital stereo signal processing device 30.

In this embodiment example, the reference signal, a sine wave, is always available.

The foregoing is a description corresponding to German Application P 31 36 522.1, dated Sept. 15, 1981, the International priority of which is being claimed for the instant application, and which is hereby made part of this application. Any discrepancies between the foregoing specification and the aforementioned German application are to be resolved in favor of the latter.

We claim:

1. Method for digitally controlling the phase of the system clock frequency of a digital signal processing system which processes an analog signal containing a reference signal, wherein a fixed phase relation exists between the reference signal and the system clock frequency, which comprises digitalizing the reference signal by sampling the analog reference signal, weighting the scanning values of the digitalized reference signal for obtaining a digital phase comparison variable, feeding the phase comparison variable through a digital PLL filter to a digitally controlled oscillator, and deriving the system clock frequency from the output signal of the digitally controlled oscillator.

2. Apparatus for carrying out a method for digitally controlling the phase of the system clock frequency of a digital signal processing system which processes an analog signal containing a reference signal, wherein a fixed phase relation exists between the reference signal and the system clock frequency, comprising an A/D converter for receiving and digitalizing the analog signal containing the reference signal by sampling with a clock signal derived from the system clock frequency, a sampler being connected to and addressed by said A/D converter, a phase comparison circuit connected to said sampler for receiving every n-th sampling value of the reference signal from said sampler during the active time of the reference signal, said comparison circuit determining a phase deviation between the digitalized reference signal and the system clock frequency by weighting, a PLL filter connected to said phase comparison circuit for receiving said phase deviation and providing digital output signals, an oscillator being connected to said PLL filter and being controllable by said digital output signals, said oscillator having an output providing an output signal from which the system clock frequency can be derived.

3. Apparatus for synchronizing the system clock frequency of a digital color decoder with the first signal contained in the FBAS signal of a color television receiver containing a burst signal having a given burst time, comprising an A/D converter for receiving and digitalizing the FBAS signal by sampling with n-times the color carrier frequency, a sampler being connected to and addressed by the A/D converter, a phase comparison circuit connected to said sampler for receiving every n-th sampling value of the burst signal from said sampler during the burst time, said comparison circuit determining a phase deviation between the digitalized burst signal and the system clock frequency by weighting, a PLL filter connected to said comparison circuit for receiving the phase deviation and providing digital output signals, and an oscillator being connected to said PLL filter and being controllable by said digital output signals, said oscillator having an output providing an output signal from which the system clock frequency can be derived.

4. Apparatus according to claim 3, wherein n=4.

5. Apparatus according to claim 2, including a digital filter connected between said A/D converter and said sampler acting as a highpass filter for determining the mean position of the reference signal.

6. Apparatus according to claim 3, including a digital filter connected between said A/D converter and said sampler acting as a highpass filter for determining the mean position of the burst signal.

7. Apparatus according to claim 2 or 3, wherein said PLL filter is in the form of a proportional integrating filter.

8. Apparatus according to claim 2 or 3, wherein said PLL filter is constructed in accordance with the filter function:

$$H(z) = a + \frac{z'-1}{1-z'-1};$$

where $z' = e^{j2\pi f/f_z}$ and $f_z$ is the line frequency.

9. Apparatus according to claim 2, wherein said phase deviation formed by said comparison circuit is a mean value $\phi_d$ over sampling values of the reference signal for each n-th line according to:

$$\phi_d = \sum_j (+B_{0+j} - B_{1+j} - B_{2+j} + B_{3+j});$$

and for each n (−1)-th line according to:

$$\sum_j (-B_{0+j} - B_{1+j} + B_{2+j} + B_{3+j});$$

wherein j=0, 4, 8, . . . .

10. Apparatus according to claim 3, wherein said phase deviation formed by said comparison circuit is a mean value $\phi_d$ over sampling values of the burst signal for each n-th line according to:

$$\phi_d = \sum_j (+B_{0+j} - B_{1+j} - B_{2+j} + B_{3+j});$$

and for each n (−1)-th line according to:

$$\sum_j (-B_{0+j} - B_{1+j} + B_{2+j} + B_{3+j});$$

wherein j=0, 4, 8, . . . .

11. Apparatus according to claim 2, including means for supplying a color correction value, and including a subtracting stage connected to said sampler, to said phase comparison circuit and to said supplying means, for subtracting said color correction value from sampling values of the reference signal.

12. Apparatus according to claim 3, including means for supplying a color correction value, and including a subtracting stage connected to said sampler, to said phase comparison circuit and to said supplying means, for subtracting said color correction value from sampling values of the burst signal.

13. Apparatus for the phase-locked synchronization of the system clock frequency of a device for digitally processing a stereo signal with a pilot tone contained in the stereo signal, comprising an A/D converter for receiving and digitalizing the stereo signal by sampling with n-times the frequency of the pilot tone, a digital filter connected to said A/D converter acting as a bandpass for the frequency of the pilot tone, a sampler being connected to said digital filter and being addressed by said A/D converter through said digital filter, a phase comparison circuit connected to said sampler for receiving every n-th sampling value of the pilot tone, said phase comparison circuit determining a phase deviation between the digitalized pilot tone and the system clock frequency by weighting, a PLL filter connected to said phase comparison circuit for receiving the phase deviation and for providing digital signals, and an oscillator being connected to said PLL filter and being controllable by said digital signals provided by said PLL filter, said oscillator having an output providing output signals from which the system clock frequency can be derived.

14. Apparatus according to claim 13, wherein n=8.

* * * * *